United States Patent [19]
Roll et al.

[11] Patent Number: 5,606,989
[45] Date of Patent: Mar. 4, 1997

[54] SELF-VENTING VALVE ARRANGEMENT

[75] Inventors: Mark A. Roll; Willie L. Stamey; Christopher L. Loafman, all of Gastonia, N.C.

[73] Assignee: Dana Corporation, Toledo, Ohio

[21] Appl. No.: 455,678

[22] Filed: Jun. 1, 1995

[51] Int. Cl.$^6$ .................................... F16K 24/00
[52] U.S. Cl. .................... 137/203; 137/588; 251/100; 251/322; 251/323; 210/248; 210/313; 210/418; 210/436
[58] Field of Search ................. 210/248, 313, 210/418, 436, 472, 533, 534, 535; 137/203, 588; 251/95, 100, 321, 322, 323

[56] References Cited

U.S. PATENT DOCUMENTS

| | | |
|---|---|---|
| 807,243 | 12/1905 | Chapin . |
| 2,506,722 | 5/1950 | Kuehn et al. ............ 251/322 |
| 3,005,475 | 10/1961 | Beall, Jr. ................. 137/588 |
| 3,768,659 | 10/1973 | Miller ...................... 210/313 |
| 4,142,677 | 3/1979 | Ludwig ................... 236/101 |
| 4,440,193 | 4/1984 | Matheson ................ 137/558 |
| 4,515,690 | 5/1985 | Yasuhara ................. 210/90 |
| 4,570,677 | 2/1986 | Roxton et al. .......... 137/881 |
| 4,724,074 | 2/1988 | Schaupp .................. 210/163 |
| 4,855,041 | 8/1989 | Church et al. .......... 210/120 |
| 5,433,410 | 7/1995 | Foltz ........................ 251/100 |

*Primary Examiner*—Matthew O. Savage
*Attorney, Agent, or Firm*—Millen, White, Zelano, Branigan, P.C.

[57] ABSTRACT

A self-venting valve having its principal parts molded of nylon reinforced with glass fibers is mounted in the bottom of a fuel filter assembly to drain water and other contaminants from the assembly. The self-venting valve includes a plunger portion with a bore therethrough for draining water from the fuel filter assembly and a valve body member which receives the plunger. The valve body member has a vent hole therein which communicates with the interior of the housing to let air into the housing so that as the water drains from the housing a partial vacuum is not created which might interrupt the flow of water. The plunger is biased to the valve closed position by a coil spring, however the valve may be held in the open position by misaligning lugs on the plunger with slots in the valve body member.

10 Claims, 4 Drawing Sheets

SELF-VENTING VALVE ARRANGEMENT

FIELD OF THE INVENTION

This invention relates to self-venting valves, and more particularly, this invention relates to self-venting valves, especially useful for draining water from fuel filter assemblies.

BACKGROUND OF THE INVENTION

A problem which occurs with fluid filter assemblies, particularly useful for diesel engines and gasoline marine engines, is facilitating the removal of contaminants from the filter assembly. These contaminants include water and particulate matter which tend to settle at the bottom of housings used to retain filter elements. In order to remove the water and particulate matter suspended in the water, drain valves are frequently positioned at the bottom of housings used to retain filter elements. If a simple drain cock is utilized for the valve, the drainage may not be complete or may not occur at all because a partial vacuum is created in the filter housing upon initiating drainage. The partial vacuum prevents water from flowing through the open valve.

In order to facilitate drainage by breaking the partial vacuum, drainage valves in fuel filters are vented. It is necessary to close the vent hole when the valves are closed so that fluid within the fluid filter does not flow out through the vent hole. In prior art arrangements, there is the possibility of vent holes becoming blocked by particulate debris suspended in the fuel or water at the bottom of the housing. This is because the end of the vent tube, which opens within the housing, is left continuously open so that over time particles can accumulate in the vent tube.

In addition to improving the reliability of self-venting valves by having valves which are less likely to have clogged vent tubes, it is also desirable to have a valve which is relatively easy to retrofit and install in existing fuel filter assemblies without extensive modification of those assemblies.

SUMMARY OF THE INVENTION

It is a feature of the present invention to provide a new and improved self-venting valve for fuel filters and the like, which self-venting valve is reliable and is configured for ease of assembly and operation.

The present invention is directed to a self-venting valve useful for draining water from a housing, such as a fuel filter housing, wherein the valve includes a valve body member having a first end for positioning within the housing and a second end for positioning outside of the housing, the valve body member having a plunger retaining bore therethrough for receiving a plunger member. The improvement in the self-venting valve comprises a sealing surface on the plunger member. The sealing surface is positioned for sealing engagement with the first end of the valve body member to close the valve when the plunger member is in a first position and for unsealing with the first end of the valve body member when the plunger member is in a second position. An axially extending bore in the plunger allows liquid to drain therethrough from the housing. The axially extending bore has a first end opening outside of the valve body member and a second end opening within the valve body member. A spring biases the plunger to the first position to close the valve. A vent is disposed in the valve body member and has a first end for opening within the housing to let air into the housing and a second end for opening to the atmosphere, the first end of the vent being closed when the plunger is in the first position.

In a further aspect, the first end of the vent within the housing is aligned with a sealing surface on the plunger and is closed by engagement of the sealing surface therewith when the sealing surface closes the valve.

In still a further aspect of the instant invention, the plunger member is slidably received within the plunger retaining bore of the valve body member and a retainer arrangement selectively holds the plunger in the second position where the valve is opened against the bias of the spring.

Upon further study of the specification and appended claims, further features and advantages of this invention will become apparent to those skilled in the art.

BRIEF DESCRIPTION OF THE DRAWINGS

Various other objects, features and attendant advantages of the present invention will be more fully appreciated as the same becomes better understood when considered in conjunction with the accompanying drawings in which like reference characters designate the same or similar parts throughout the several views, and wherein.

DETAILED DESCRIPTION

Figure 1:
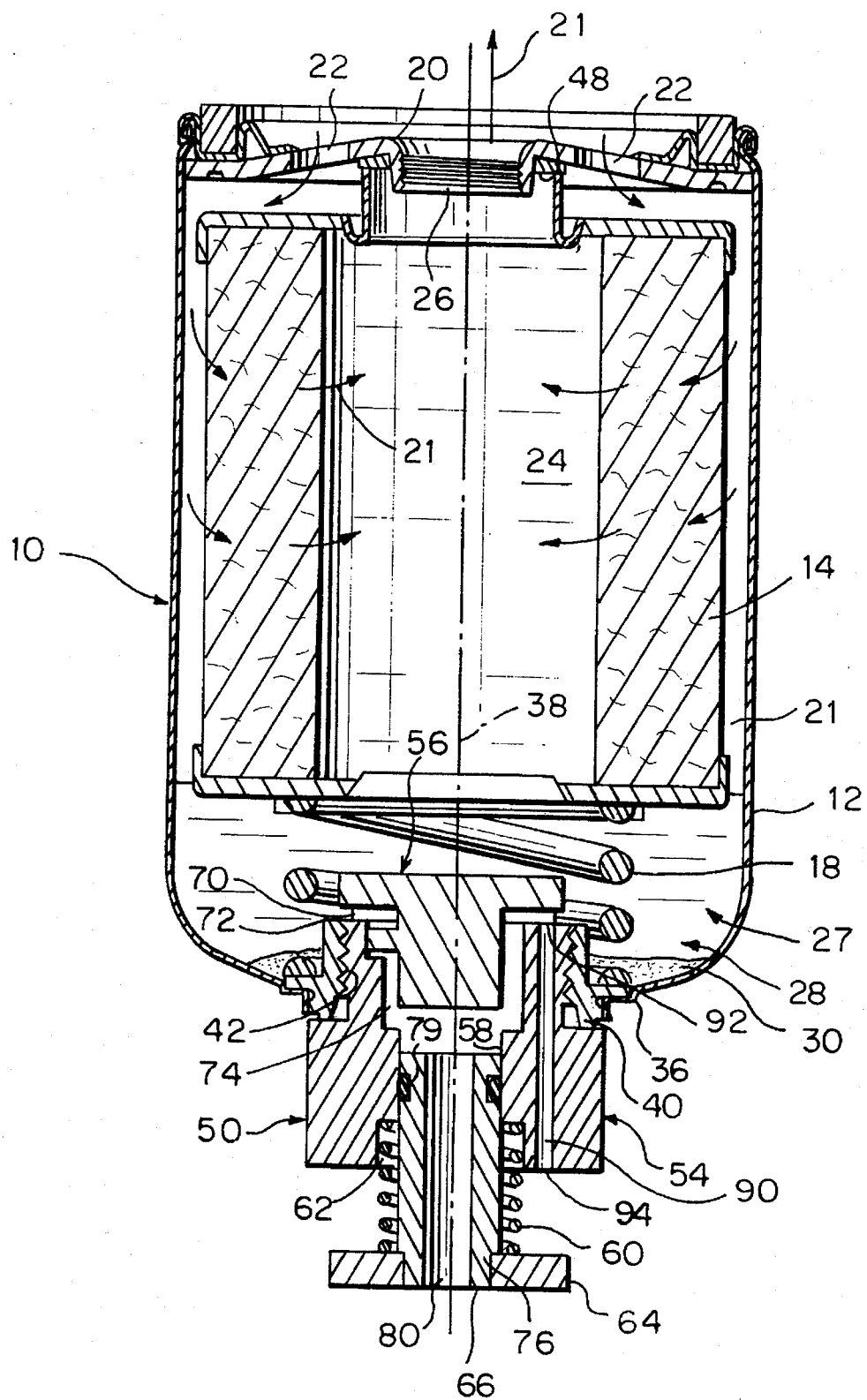
FIG. 1 is a side elevation showing the self-venting valve of the present invention in a first position in which the valve is closed.
Figure 2:
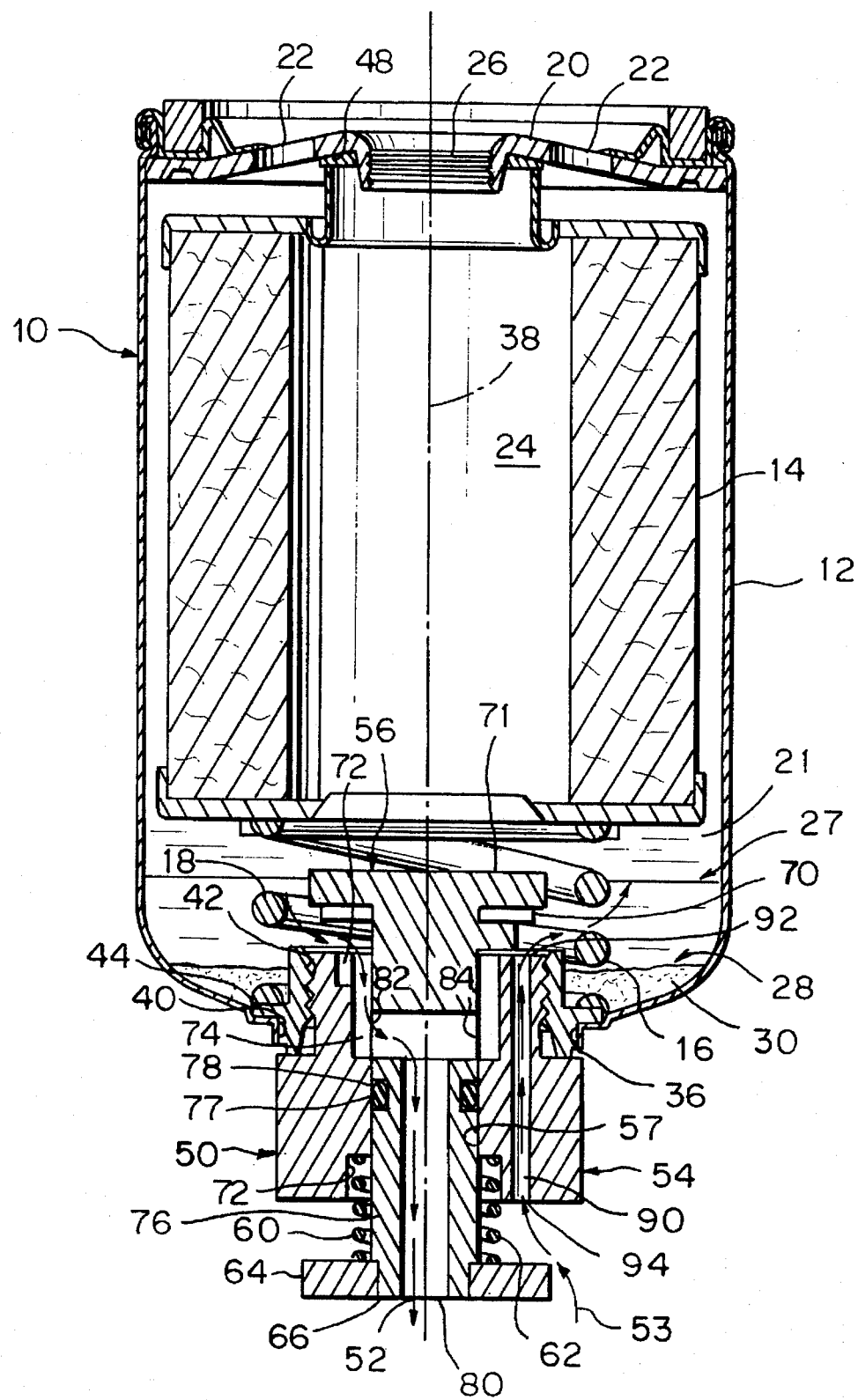
FIG. 2 is a view similar to FIG. 1, but showing the self-venting valve in a second position in which the valve is open.

Referring now mainly to FIGS. 1 and 2 there is shown a filter assembly 10 configured of a housing 12 in which is disposed a filter element 14 that is biased by a coil spring 18 to seat against an end cap 20. In operation, represented by arrows 21 fuel to be filtered enters the housing 12 through a plurality of inlets 22 flows outside of the filter element 14 and through the filter element 14 into a hollow core 24. The fuel 21 then flows out of end plate 20 through threaded outlet 26 and is delivered to an engine such as a diesel or other internal combustion engine.

The filter 14 separates water 27 from the fuel 21 as the fuel passes through the filter and the water pools in a space 28 at the bottom of the housing 12. Solid particulate contaminants 30, which have been filtered out by the filter 14, also tend to fall out of the fuel 21 and water 27 and accumulate in the space 28 in the bottom of the housing 12.

Disposed in an end opening 36 which is coaxial with the axis 38 of the fuel filter assembly 10 is an internally threaded base 40 having an internal thread 42. The base 40 has a shelf 44 against which one end of the coil spring 18 bears, the other end of the coil spring bearing against the filter element 14 to hold the filter element in engagement with the plate 20 at an area 48 surrounding the outlet 26.

In order to drain water 27 which has accumulated in the space 28 of the housing 12, a self-venting valve 50 is threadably received in the base 40. As is seen in FIG. 1, when the valve is closed, liquid in the housing 12 cannot drain from the filter assembly. As is seen in FIG. 2, when self-venting the valve 50 is open, water 27 flows in the path of arrow 52 through the self-venting valve 50 while air follows the path of arrow 53 into the housing 12 to prevent a partial vacuum from occurring therein which would interfere with the flow of water out of the valve 50. Since water is heavier than fuel 21, water 27 accumulates in the space 28 while fuel remains above the top surface of the water. The valve 50 is held in the FIG. 2 position until the person draining water 27 from the filter assembly 10 detects only fuel 21 draining therefrom.

The self-venting valve 50 has two main components, a valve body member 54 (see FIGS. 3–5) and a valve plunger member 56 (see FIGS. 6–8) which is slidably received within a plunger receiving, central bore 57 in the body member. A coil spring 60 seated within a first circular recess 62 in the valve body 54 biases the plunger 56 to the first position by bearing against a knob 64 fixed to a first end 66 of the plunger 56.

In order to drain water from the space 28 in the housing 12, the plunger 56 is pressed inwardly by pushing on the knob 64. This compresses the coil spring 60 and lifts a gasket 70 from engagement with a first end 72 of the valve body 50. The gasket 70 is backed by a circular flange 71 which has a diameter slightly greater than the gasket 70. Opening at the first end 72 of the valve body 50 is a second circular recess 74 which has a diameter larger than the diameter of a spindle portion 76 of the valve plunger 56. The spindle 76 has an outside diameter complimenting the inside diameter of the central bore 77 in the valve body member that connects the first and second circular recesses 62 and 74. An O-ring 78 seals the gap between the central bore 57 and the spindle 76.

The valve plunger member 56, valve body member 54 and handle 64 are all molded of nylon with 33% glass fibers mixed therein. The O-ring 78 and gasket are made of nitrile rubber and the coil spring 60 is a steel wire spring. In order to assemble the valve, the O-ring 78 is first stretched around the spindle 76 of the valve plunger member 56 and seated in a groove 79. The spindle 76 is then thrust through the second circular recess 74, central bore 78 and first circular recess 72. The coil spring 60 is then placed over the spindle 76 and the knob 64 fixed to the end of the spindle 76 by glue. The thus-assembled self-venting valve 50 is then screwed into the internally threaded base 40.

The gasket 70 when lifted from the FIG. 1 to the FIG. 2 position therefor opens a path around the spindle portion 76 through which fluid can flow. Within the spindle 76 is a central bore 80 which has lateral openings 82 and 84. When the plunger 56 is lifted from its FIG. 1 to its FIG. 2 position, any water 27 entering the second circular recess 74 flows through the lateral openings 82 and 84 of the central bore 80 and out of the central bore as indicated by the arrow 52.

Disposed in the base member 50 is a vent tube 90. The vent tube 90 has a first end 92 which opens to the interior of the housing 12 and a second end 94 which opens to the atmosphere. When the plunger 56 is lifted from the first portion of FIG. 1 to the second portion of FIG. 2 by pushing the knob 64 against the bias of spring 60, the gasket 70 which covered the first end 92 of the air vent 90 opens the first end allowing air to flow into the housing 12. The partial vacuum in the housing 12 which results from water 27 flowing out of the central bore 80 is thereby relieved.

Figure 3:
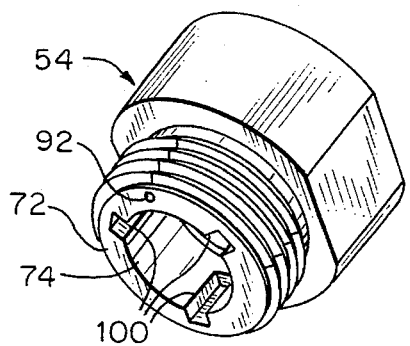
FIG. 3 is a perspective view in actual size of a valve body member.
Figure 4:
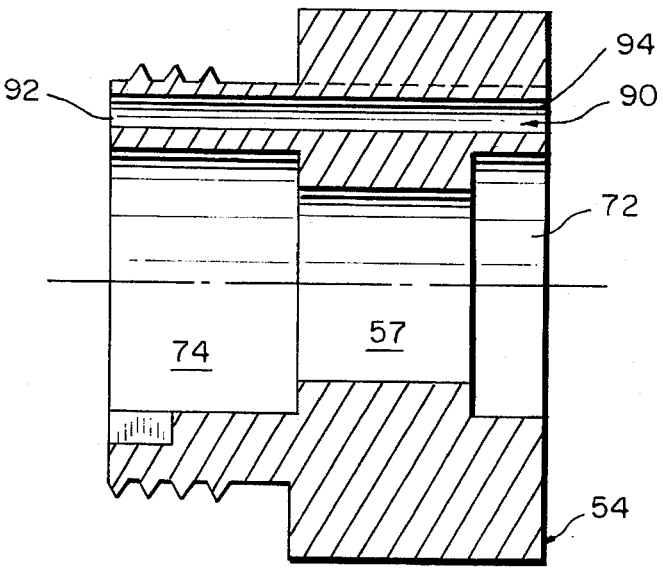
FIG. 4 is an enlarged side elevation of the valve body of FIG. 3, taken along lines 3—3 thereof.
Figure 5:
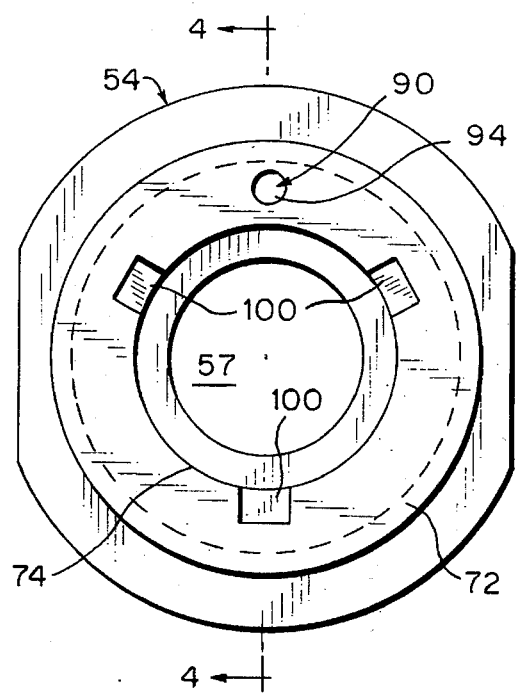
FIG. 5 is an end view of the first end of the valve body member of FIGS. 3 and 4.
Figure 6:
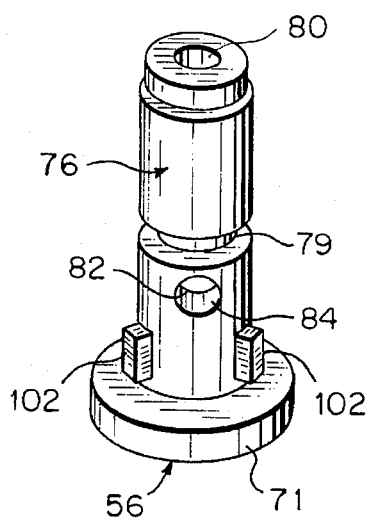
FIG. 6 is an actual size, perspective view of a valve plunger member received in the valve body member of FIGS. 3-5.
Figure 7:
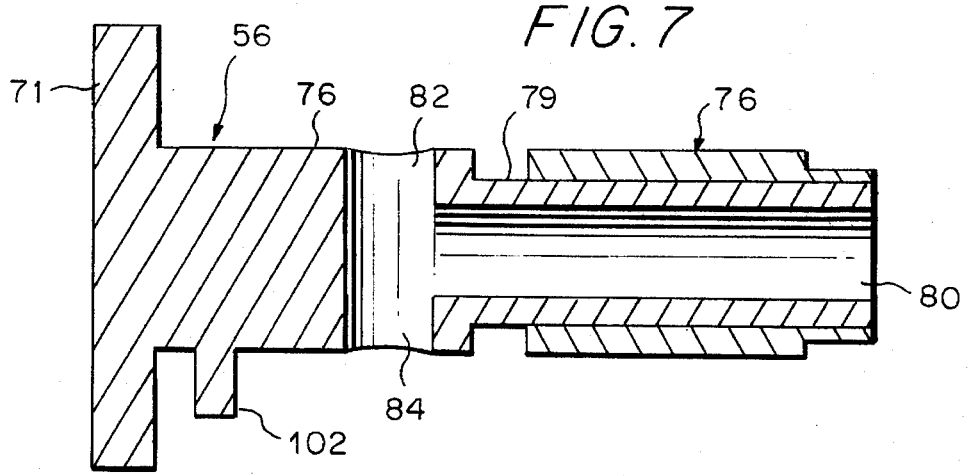
FIG. 7 is an enlarged, side elevation of the valve plunger member taken along lines 7—7 of FIG. 8.
Figure 8:
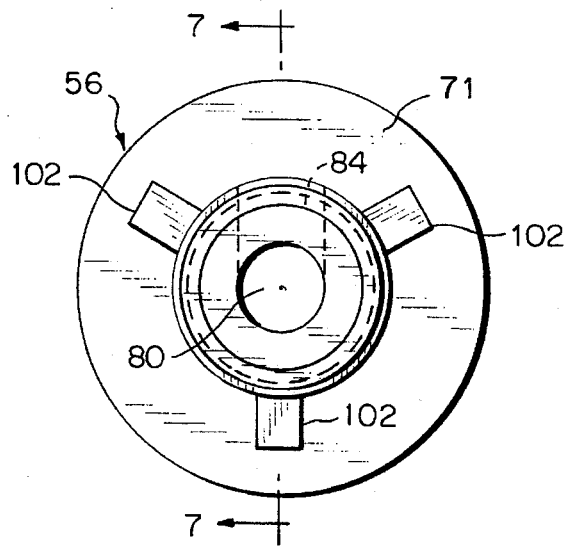
FIG. 8 is an end view of the valve member of FIGS. 6 and 7.

Referring now mainly to FIGS. 3–5 which show the valve body member 50, and FIGS. 6–8 which show the valve plunger member 56, it is seen that the valve body member has three radial slots 100 disposed in the wall of the second recess 74, which slots open at the first end 72 of the body member 56, which slots 100 receive three lugs 102 that project radially from the spindle 76 of the plunger member 56. The lugs 102 are axially spaced from the gasket 70 backed by the flange 71.

When the plunger member 56 is in the FIG. 1 position, the lugs 102 are aligned with and pulled into the slots 100 by the coil spring 60 or the coil spring 60 presses against the knob 64. As is seen in FIG. 1, when the valve is closed, the lugs 102 do not bottom in the slots 100 and consequently, the gasket 70 seals against the first end 72 of the valve body 56, thus sealing therewith and preventing fuel 21 (or water 27) from flowing through either the bore 80 in the plunger member 56 or the vent 90 in the valve body member 50. The first opening 92 of the vent 90 is disposed a distance above the bottom surface of the housing 12 so that the risk of the particulate matter 30 flowing into and blocking the vent tube 90 is minimized.

When the valve is opened to the FIG. 2 position and rotated so that the lugs 102 are out of alignment with the slots 100, the knob 64 may be released with the self-venting valve 50 open because the lugs 102 rest on the first end 72 of the valve body 54 and serve as a plunger retaining arrangment.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. In a self-venting valve useful for draining contaminants including water from a fuel filter housing, wherein the valve includes a plunger member having first and second ends, and a valve body member having a first end for positioning within the housing and a second end for positioning outside of the housing, the improvement comprising:

a plunger member receiving bore extending through valve body, the plunger member being mounted in the plunger member receiving bore and defining a recess with said plunger member receiving bore at the first end of the valve body;

a sealing surface on the first end of the plunger member, the sealing surface being positioned for sealing engagement with the first end of the valve body member to close said recess when the plunger member is in a first position and for unsealing with the first end of the valve body when the plunger member is in a second position;

an axially extending bore in the plunger member for drawing water therethrough from the housing, the axially extending bore having a first end opening through the second end of the plunger outside of the valve body and a second opening to said recess within the valve body;

a spring engaging the second end of plunger member for urging the plunger member to the first position;

a retainer arrangement for selectively holding the plunger member in the second position upon rotating the plunger member; and a vent passage separate from said plunger member receiving bore disposed in the valve body, the vent passage having a first end opening through the first end of the valve body for opening within the housing to let air into the housing and a second end opening through the second end of the valve body for opening to the atmosphere, the first end of the vent being closed by the sealing surface of the plunger member when the plunger member is in the first position.

2. The improvement of claim 1, wherein the retainer arrangement comprises at least one lug on the plunger member and a slot on the valve body member, wherein the lug is received in the slot when the plunger member is in the first position and misaligned with the slot to hold the plunger member in the second position.

3. The improvement of claim 2, wherein the spring is a coil spring positioned around the plunger and extending in abutment between the second end portion of the plunger member and the second end portion of the valve body member.

4. The improvement of claim 3, wherein the portion of the plunger member abutted by the coil spring is a knob integral with the second end of the plunger member.

5. The improvement of claim 1, wherein the sealing surface on the plunger member is on a flexible gasket disposed on a flange on the first end of the plunger member.

6. The improvement of claim 1, wherein the valve body member and plunger member are made of plastic material.

7. The improvement of claim 1, wherein the plunger member and valve body member are molded nylon with glass fibers embedded therein.

8. The improvement of claim 1, further including a base member adapted to be retained within the housing, the base member having a threaded bore therethrough and further including a threaded neck on the valve body member which threaded neck is screwed into the bore of the base member.

9. The improvement of claim 8, wherein the valve body member and plunger member are made of plastic material.

10. The improvement of claim 8, wherein the plunger member and valve body member are molded nylon with glass fibers embedded therein.

* * * * *